US009862388B2

(12) United States Patent
Goppert et al.

(10) Patent No.: US 9,862,388 B2
(45) Date of Patent: Jan. 9, 2018

(54) METHOD FOR CONTROLLING A DRIVE TRAIN HAVING A DOUBLE-CLUTCH TRANSMISSION

(71) Applicant: Schaeffler Technologies AG & Co. KG, Herzogenaurach (DE)

(72) Inventors: Georg Goppert, Hausach (DE); Artur Schlappa, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 19 days.

(21) Appl. No.: 15/025,776

(22) PCT Filed: Sep. 19, 2014

(86) PCT No.: PCT/DE2014/200484
§ 371 (c)(1),
(2) Date: Mar. 29, 2016

(87) PCT Pub. No.: WO2015/048963
PCT Pub. Date: Apr. 9, 2015

(65) Prior Publication Data
US 2016/0244061 A1 Aug. 25, 2016

(30) Foreign Application Priority Data

Oct. 4, 2013 (DE) .................. 10 2013 220 154
Jan. 21, 2014 (DE) .................. 10 2014 201 022

(51) Int. Cl.
*B60W 10/02* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 7,061,146 B2 6/2006 Hirt et al.
8,583,336 B2 * 11/2013 Tsujimura ............... F16D 48/08
701/68

(Continued)

FOREIGN PATENT DOCUMENTS

DE 10316459 10/2003
DE 102005036894 3/2006
(Continued)

*Primary Examiner* — Dirk Wright
(74) *Attorney, Agent, or Firm* — Volpe and Koenig, P.C.

(57) ABSTRACT

The invention relates to a method for controlling a drivetrain having an internal combustion engine, a dual-clutch transmission, having a first and second sub-transmission having at least one shiftable gear ratio, a first friction clutch disposed between the internal combustion engine and the first sub-transmission and a second friction clutch disposed between the internal combustion engine and the second sub-transmission to provide a drivetrain torque at a transmission output of the dual-clutch transmission by transferring an engine torque adjusted thereto via the friction clutches. So as to be able to continue operating a friction clutch which may have a previously damaged friction lining, at a first clutch torque transferred via the first friction lining, depending on a friction coefficient and a current temperature of a second friction lining of the second friction clutch, the second friction clutch is engaged at a gear ratio selected in the second sub-transmission and the friction lining is heated to a specified temperature.

7 Claims, 2 Drawing Sheets

(51) Int. Cl.

| | |
|---|---|
| *F16H 61/688* | (2006.01) |
| *F16D 48/06* | (2006.01) |
| *B60W 10/06* | (2006.01) |
| *B60W 10/113* | (2012.01) |
| *B60W 30/19* | (2012.01) |
| *F16D 21/00* | (2006.01) |
| *F16D 48/00* | (2006.01) |
| *F16H 59/72* | (2006.01) |

(52) U.S. Cl.
CPC .......... *B60W 10/113* (2013.01); *B60W 30/19* (2013.01); *F16D 21/00* (2013.01); *F16D 48/00* (2013.01); *F16D 48/06* (2013.01); *F16D 48/064* (2013.01); *F16H 61/688* (2013.01); *B60W 2510/0258* (2013.01); *B60W 2510/0291* (2013.01); *B60W 2510/1005* (2013.01); *B60W 2710/025* (2013.01); *B60W 2710/027* (2013.01); *B60W 2710/029* (2013.01); *B60W 2710/0666* (2013.01); *B60W 2710/1005* (2013.01); *F16D 2500/1045* (2013.01); *F16D 2500/10412* (2013.01); *F16D 2500/30402* (2013.01); *F16D 2500/30404* (2013.01); *F16D 2500/50233* (2013.01); *F16D 2500/7043* (2013.01); *F16D 2500/70426* (2013.01); *F16H 2059/725* (2013.01)

(56) References Cited

U.S. PATENT DOCUMENTS

| | | | |
|---|---|---|---|
| 8,849,532 B2* | 9/2014 | Burtch | F16D 48/062 |
| | | | 477/174 |
| 8,897,979 B2* | 11/2014 | Hebbale | F16D 48/06 |
| | | | 701/67 |
| 8,914,186 B2* | 12/2014 | Tao | F16H 61/12 |
| | | | 701/29.2 |
| 9,090,240 B2* | 7/2015 | Burtch | B60W 10/02 |
| 9,335,234 B2* | 5/2016 | Eo | G01M 13/022 |
| 9,556,934 B2* | 1/2017 | Terashima | F16H 61/688 |
| 2009/0069992 A1 | 3/2009 | Preisner et al. | |

FOREIGN PATENT DOCUMENTS

| | | |
|---|---|---|
| DE | 102010049931 | 5/2011 |
| DE | 102012210201 | 1/2013 |
| EP | 1067008 | 1/2001 |
| WO | 2007124710 | 11/2007 |

\* cited by examiner

मेथड FOR CONTROLLING A DRIVE TRAIN HAVING A DOUBLE-CLUTCH TRANSMISSION

BACKGROUND

The invention relates to a method for controlling a drivetrain having an internal combustion engine, a dual-clutch transmission, having a first and second sub-transmission having at least one shiftable gear ratio, a first friction clutch disposed between the internal combustion engine and the first sub-transmission and a second friction clutch disposed between the internal combustion engine and the second sub-transmission to provide a drivetrain torque at a transmission output of the dual-clutch transmission by transferring an engine torque adjusted thereto via the friction clutches.

From DE 10 2005 036 894 A1, FIG. 1 of which is reproduced in this case, a drivetrain 1 of this species is known, having a parallel shift transmission 16 as a dual-clutch transmission, wherein the engine torque of the internal combustion engine, delivered by the crankshaft 10, controlled by means of a dual clutch having two friction clutches 12, 14, is transferred via the two sub-transmissions 16a, 16b to a transmission output 18. When a friction clutch 12, 14 assigned here to one sub-transmission 16a, 16b is disengaged, the gear ratios are shifted and deselected. The actual shifting of the dual-clutch transmission 16 takes place with gear ratios (defined by gears 1, 2, 3, 4, 5, 6, R) selected in both sub-transmissions, 16b, 16a, by means of a so-called overlapping shift mechanism, known, for example, from WO 2007/124710 A1, wherein the engaged friction clutch 12, 14 of one sub-transmission 16a, 16b which is transferring torque is disengaged, and the disengaged friction clutch 14, 12 of the other sub-transmission 16b, 16a is engaged in an overlapping manner. The clutch arrangements 12, 14 here are shown in a housing 34 with spring damper arrangements 36, 38 between the clutches and the concentric transmission input shafts 40, 42. Within the sub-transmissions 16a, 16b, the different transmission ratios are indicated at 52, 54, 56, 68, 60, 62, 64, 66, and the associated transmission gears are indicated as 68, 70, 72, 74, 76, 78, 80, 82, 84, 86, 88, 90, 92, 94. The friction clutches are designed here with regard to their transfer capacity so that at least the maximum engine torque is transferable when the friction clutch is completely engaged. As this occurs, the engine torque and the clutch torques of the friction clutches are ascertained or estimated constantly over their service life. If it is found that, for example, due to previous damage to a friction clutch, its transfer capacity is no longer adequate for a present engine-torque, the engine torque is limited to the clutch torque which is still transferable via the friction clutch in question. This results in performance losses in the drivetrain, with the sub-transmission being operated with the limitedly functional friction clutch.

SUMMARY

The object of the invention is to improve a method for operating a drivetrain having a dual-clutch transmission when a friction clutch of one sub-transmission is limitedly functional.

The object is fulfilled by the combination of one or more features of the invention. Advantageous embodiments of the method are described below.

The proposed method serves to control a drivetrain having an internal combustion engine, a dual-clutch transmission, having a first and second sub-transmission having at least one shiftable gear ratio, a first friction clutch disposed between the internal combustion engine and the first sub-transmission and a second friction clutch disposed between the internal combustion engine and the second sub-transmission to provide a drivetrain torque at a transmission output of the dual-clutch transmission by transferring an engine torque adjusted thereto via the friction clutches. So as to be able to continue operating a drivetrain with a friction clutch which is limited in its function, having a previously damaged friction lining, at a first clutch torque transferred via the first friction lining, depending on a friction coefficient and a current temperature of a second friction lining of the second friction clutch, the second friction clutch is engaged at a gear ratio selected in the second sub-transmission and the friction lining is heated to a specified temperature.

DETAILED DESCRIPTION OF THE PREFERRED EMBODIMENTS

Figure 1:
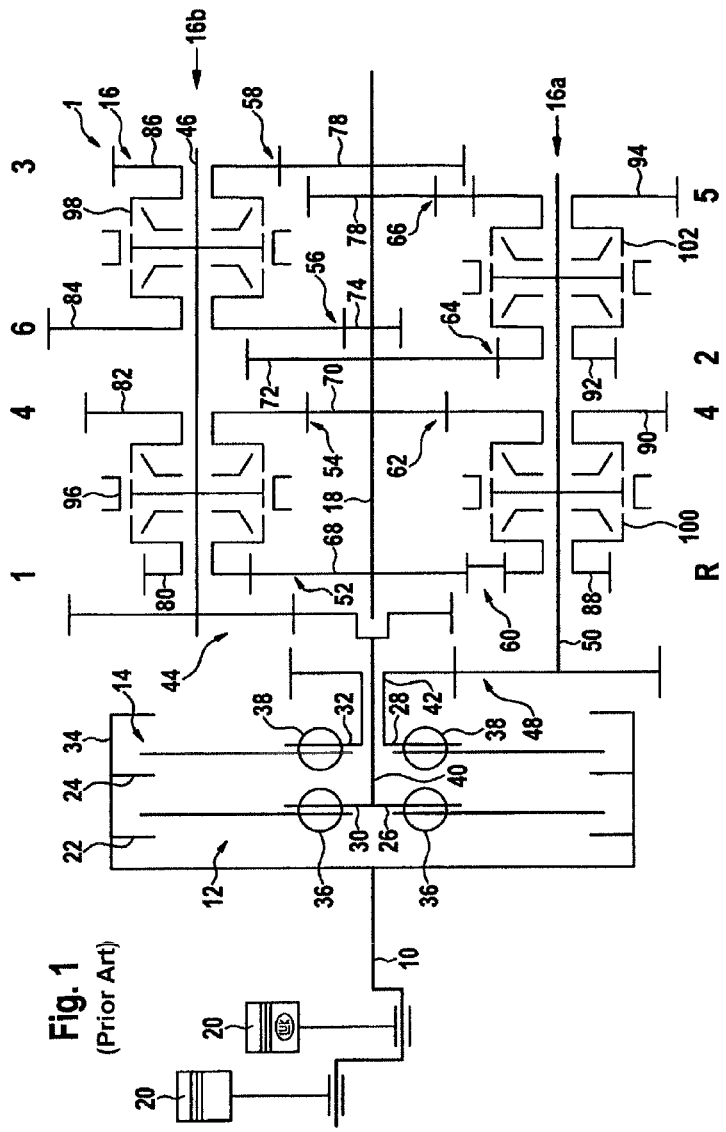
FIG. 1 is a prior art schematic illustration of a drivetrain with a parallel clutch transmission.
Figure 2:
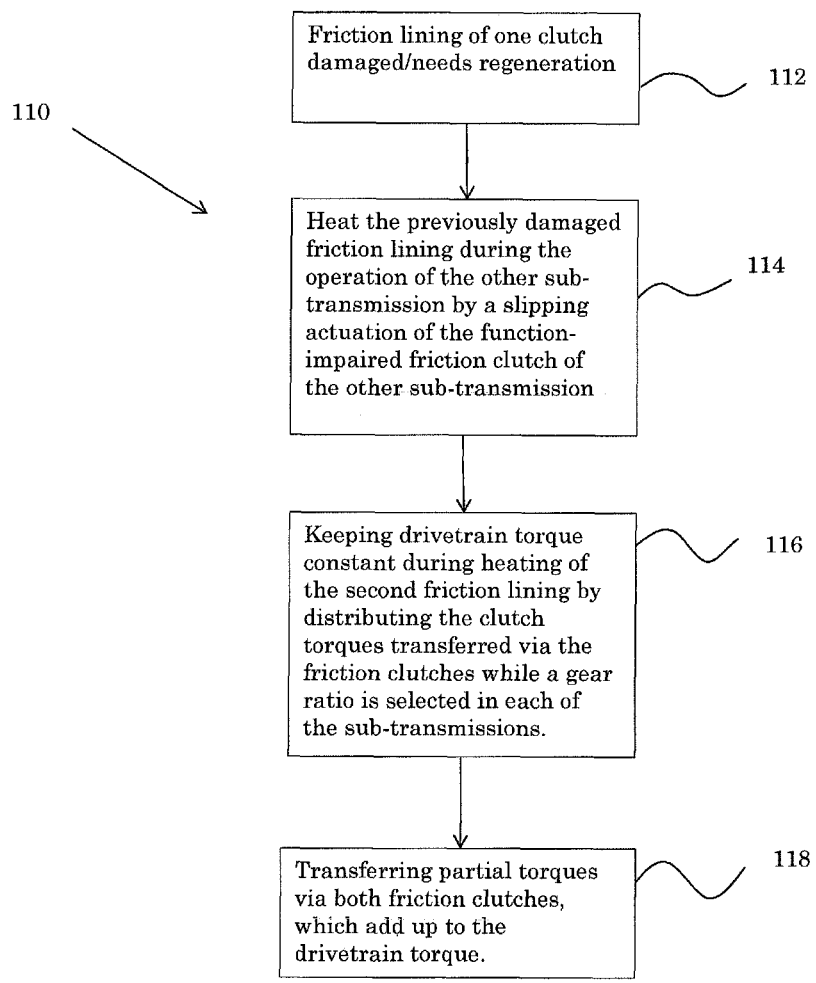
FIG. 2 is a flow chart illustrating the method according to the present invention.

The present method is illustrated in FIG. 2 by the flow chart 110. It has been found that a friction lining damaged previously, for example by overheating, as indicated at 112 in FIG. 2, has a lower coefficient of friction at lower temperatures, for example at temperatures below an operating temperature of a friction clutch, than at temperatures in the range of the operating temperature. The friction lining can be regenerated by heating the previously damaged friction lining during the operation of the other sub-transmission as indicated at 114 in FIG. 2, preferably in low-load and partial-load phases of the drive train, by a slipping actuation of the function-impaired friction clutch of the other sub-transmission.

It has proven advantageous here if the drivetrain torque is kept constant during heating of the second friction lining by distributing the clutch torques transferred via the friction clutches while a gear ratio is selected in each of the sub-transmissions, as indicated at 116 in FIG. 2. By this means, a regeneration of the friction lining can take place virtually unnoticed by the driver and any occupants of the vehicle, since there is no perceptible loss of performance. This means that partial torques are transferred via both friction clutches, which add up to the drivetrain torque, as indicated at 118 in FIG. 2. Torque lost here to the slipping operation of the second friction clutch to heat the previously damaged friction lining can be compensated for by increasing the engine torque. Torque losses can be formed, for example, from the development of heat in the friction lining being regenerated and the like.

In order to be able to hold a load against the slipping clutch without additional components, advantageously in the sub-transmission having the function-damaged friction clutch a gear ratio is likewise selected, which transfers the clutch torque present at the slipping friction clutch to the transmission output, and thus delivers a portion of the drivetrain torque. In order to keep the latter constant, during the heating of the previously damaged friction lining the first clutch torque is reduced, depending on the second clutch torque present at the second friction clutch, taking account of the ratios of the gear steps selected in the sub-transmissions.

If the second friction clutch is set with slippage to a specified clutch torque to heat the previously damaged friction lining, the drive-train torque present at the transmission output is reduced depending on the torque loss at the second sub-transmission. In order to keep the drivetrain torque constant, the engine torque is therefore preferably increased depending on the torque lost in the second sub-transmission. To this end, the clutch torque to be transferred by the first friction clutch is increased accordingly. In addition, it has proven advantageous to increase the engine torque during the heating of the friction lining depending on the gear ratio selected in the second sub-transmission. In this case, during the heating of the friction lining, a gear step with a higher transmission ratio is provided in the second sub-transmission than a transmission ratio of a gear step selected in the first sub-transmission.

With a drivetrain torque of 100 Nm for example, this results in the following setting of the involved torques, without allowing for any existing drivetrain losses, friction, efficiency restrictions and the like: with the second friction clutch disengaged, the first friction clutch transfers 100 Nm at constant travel. If, under constant drivetrain torque, the second friction clutch is engaged to a slipping transfer of a torque of 20 Nm to regenerate or heat the previously damaged friction lining, at the transmission output of the dual-clutch transmission only 13 Nm are operative at a gear ratio of 1.5. The engine torque is therefore increased to 87 Nm, depending on the gear step selected, so that the first friction clutch, transferring for example maximally or at least 87 Nm, transfers the difference missing from 100 Nm at the transmission output, and thus the drivetrain torque remains at the second friction clutch, independent of the heating process.

It has also proven to be advantageous if, when the transfer capacity of the first friction clutch is limited, an engine torque to be transferred in excess of the transfer capacity is transferred by a clutch torque provided by the second friction clutch. In this way, a limited transfer performance of one or both friction clutches, for example when the friction lining or linings are previously damaged, can be transferred essentially completely.

It goes without saying that in a corresponding manner heating of the first friction lining of the first friction clutch can occur, in that during operation of the drivetrain in the second sub-transmission, the function-impaired first friction clutch of the first sub-transmission is operated correspondingly with slippage.

The invention claimed is:

1. A method for controlling a drivetrain having an internal combustion engine, a dual-clutch transmission, having a first and a second sub-transmission having at least one shiftable gear ratio, a first friction clutch disposed between the internal combustion engine and the first sub-transmission and a second friction clutch disposed between the internal combustion engine and the second sub-transmission to provide a drivetrain torque at a transmission output of the dual-clutch transmission by transferring an engine torque adjusted thereto via the friction clutches, the method comprising when a first clutch torque is transferred via the first friction clutch, depending on a coefficient of friction and a current temperature of a second friction lining of the second friction clutch, engaging the second friction clutch with slippage when a gear ratio is selected in the second sub-transmission, and heating the friction lining to a specified temperature.

2. The method according to claim 1, further comprising keeping the drivetrain torque constant during the heating of the second friction lining by distributing the clutch torques transferred via the friction clutches while a gear ratio is selected in each of the sub-transmissions.

3. The method according to claim 2, further comprising during the heating, reducing the first clutch torque, depending on the second clutch torque present at the second friction clutch, taking into account ratios of gear steps selected in the sub-transmissions.

4. The method according to claim 2, further comprising to keep the drivetrain torque constant, increasing the engine torque, depending on a torque loss in the second sub-transmission.

5. The method according to claim 4, further comprising during the heating of the friction lining, increasing the engine torque depending on the gear ratio selected.

6. The method according to claim 1, further comprising during the heating of the friction lining, providing a gear step with a higher transmission ratio in the second sub-transmission than a transmission ratio of a gear step selected in the first sub-transmission.

7. The method according to claim 1, further comprising when the transfer capacity of the first friction clutch is limited, transferring an engine torque to be transferred in excess of the transfer capacity using a clutch torque provided by the second friction clutch.

* * * * *